United States Patent
Ameling (10) Patent No.: US 10,218,803 B2
(45) Date of Patent: Feb. 26, 2019

(54) INTEGRATION OF CLOUD SERVICES FOR CONSUMPTION IN CLOUD APPLICATIONS

(71) Applicant: SAP SE, Walldorf (DE)

(72) Inventor: Michael Ameling, Dresden (DE)

(73) Assignee: SAP SE, Walldorf (DE)

( * ) Notice: Subject to any disclaimer, the term of this patent is extended or adjusted under 35 U.S.C. 154(b) by 190 days.

(21) Appl. No.: 15/290,068

(22) Filed: Oct. 11, 2016

(65) Prior Publication Data
US 2018/0102950 A1   Apr. 12, 2018

(51) Int. Cl.
| | | |
|---|---|---|
| H04L 29/08 | (2006.01) | |
| G06F 8/30 | (2018.01) | |
| G06F 8/38 | (2018.01) | |
| G06F 9/445 | (2018.01) | |
| H04L 12/24 | (2006.01) | |

(52) U.S. Cl.
CPC ............ H04L 67/28 (2013.01); G06F 8/30 (2013.01); G06F 8/38 (2013.01); G06F 9/44505 (2013.01); H04L 41/5051 (2013.01); H04L 67/2838 (2013.01); H04L 41/5096 (2013.01); H04L 67/10 (2013.01)

(58) Field of Classification Search
CPC .................................................. H04L 67/2838
See application file for complete search history.

(56) References Cited

U.S. PATENT DOCUMENTS

| | | | | |
|---|---|---|---|---|
| 9,063,746 | B2* | 6/2015 | Yousouf | G06F 8/60 |
| 9,239,713 | B1* | 1/2016 | Lakshman | H04W 4/50 |
| 9,357,034 | B2* | 5/2016 | Kumar | G06F 9/5072 |
| 9,405,532 | B1* | 8/2016 | Sullivan | G06F 8/71 |
| 2002/0111942 | A1* | 8/2002 | Campbell | G06F 17/3089 |
| 2004/0167960 | A1* | 8/2004 | Kinner | H04L 29/06 709/203 |
| 2011/0078707 | A1* | 3/2011 | Larson | G06F 8/38 719/328 |
| 2011/0126168 | A1* | 5/2011 | Ilyayev | G06F 9/5072 717/103 |
| 2015/0057078 | A1* | 2/2015 | Moore | A63F 13/35 463/29 |
| 2016/0034318 | A1* | 2/2016 | Byreddy | G06F 9/5083 718/105 |
| 2016/0357535 | A1* | 12/2016 | Gravenites | G06F 8/60 |

(Continued)

*Primary Examiner* — Lashonda T Jacobs
(74) *Attorney, Agent, or Firm* — Buckley, Maschoff & Talwalkar LLC (57) ABSTRACT

An integration service layer is provided for interaction between applications and platform services. The platform services may be cloud services deployed on one or more cloud platforms. The integration service layer provides a set of instantiated interfaces correspondingly defined for the cloud service. The integration service layer may provide one or more interfaces for a cloud service. An application is created to run on a cloud platform. The application is implemented to consume one or more platform services from the provided platform services. The application is connected with the ISL to consume resources provided by one or more platform services from the platform services that are associated with the ISL. Connections between objects from a user interface of the created application and corresponding interfaces defined at the ISL for the one or more platform services included in the application are defined.

20 Claims, 6 Drawing Sheets

(56) References Cited

U.S. PATENT DOCUMENTS

| | | | |
|---|---|---|---|
| 2016/0359964 A1* | 12/2016 | Modi | H04L 67/26 |
| 2017/0103014 A1* | 4/2017 | Segler | G06F 11/34 |
| 2017/0111220 A1* | 4/2017 | Kumar | H04L 47/70 |
| 2017/0244593 A1* | 8/2017 | Rangasamy | H04L 41/0654 |
| 2017/0264612 A1* | 9/2017 | Kaushal | H04L 63/10 |
| 2018/0006883 A1* | 1/2018 | Melliere | G06F 9/44505 |

* cited by examiner

INTEGRATION OF CLOUD SERVICES FOR CONSUMPTION IN CLOUD APPLICATIONS

BACKGROUND

Cloud computing is the delivery of computing resources, both hardware and software resources, as a service over a network (e.g., the Internet). There are different types of cloud computing such as: Platform-as-a-Service (PaaS), Infrastructure-as-a-Service (IaaS), Software-as-a-Service (SaaS), and so on. The PaaS enables users to deploy, configure, and use business applications in a cloud environment. Further, the users are provided with the possibility to create software solutions using tools and libraries from the cloud provider. The cloud provider provides the required tools, infrastructure, and services to get user's on-demand applications up and running. Developers can use the platform to build lightweight and network-oriented applications to extend already existing solutions.

By applying the Software-as-a-Service (SaaS) model and offering business applications hosted online, the maintenance costs decrease and time is saved for the customer. Through delivering SaaS solutions, a cloud service provider may provide software applications and various hardware and software resources on-demand when requested by an end user (e.g., customer). A customer of on-demand applications or application services is free from the procurement and maintenance of the hardware and software for executing the applications or application services. The customer of on-demand applications may consume data from provided services and utilize it to extend customer's software applications running in the cloud environment.

BRIEF DESCRIPTION OF THE DRAWINGS

The claims set forth embodiments with particularity. The embodiments are illustrated by way of examples and not by way of limitation in the figures of the accompanying drawings in which like references indicate similar elements. The embodiments, together with their advantages, may be best understood from the following detailed description taken in conjunction with the accompanying drawings.

DETAILED DESCRIPTION

Embodiments of techniques for integration of cloud services for consumption in applications are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

PaaS is a category of cloud computing solutions that may include a computing platform including operating system, programming language execution environment, database, and web server to facilitate the development and deployment of on-demand applications and services. Applications can run as a SaaS on the infrastructure that is used by a PaaS provider.

Another level of cloud-computing solution is Infrastructure-as-a-Service (IaaS), in which the service provider offers computing resources in the form of physical or virtual machines, data storage, networks, load balancers, etc. The IaaS providers supply these resources on-demand from data centers. In general, cloud providers define the costs for using their resources based on the amount of resources allocated and consumed. In some cases, the customer provides applications to be executed in the cloud environment, possibly along with operating system images and other portions of the execution runtime environment. Further, users are provided by the cloud platform provider with tools, libraries and other resources to create software applications. Typically, cloud providers install and operate the applications in the cloud and cloud users access the applications from cloud clients. The cloud platform may provide the required techniques, infrastructure, and services to create users' cloud applications up and running. Developers can use the cloud platform to build lightweight and network-oriented applications to extend already existing solutions.

A cloud platform may give application developers the tools to design, develop, test, deploy and host their software applications, as well as provide application services and infrastructure to be consumed by software applications hosted on the cloud platform. In addition, service providers may provision services on existing cloud platform offerings, for consumption by running applications on the cloud platform. When an application is built on top of a cloud platform, the application may consume available services that may either be provided by the cloud provider or by external service vendors. The application may use the provided services to store data, to communicate with other systems, to handle authentication, to collect end user feedback for the application, etc. Also, services may be in different network segments and may be isolated from the rest of the cloud infrastructure.

Figure 1:
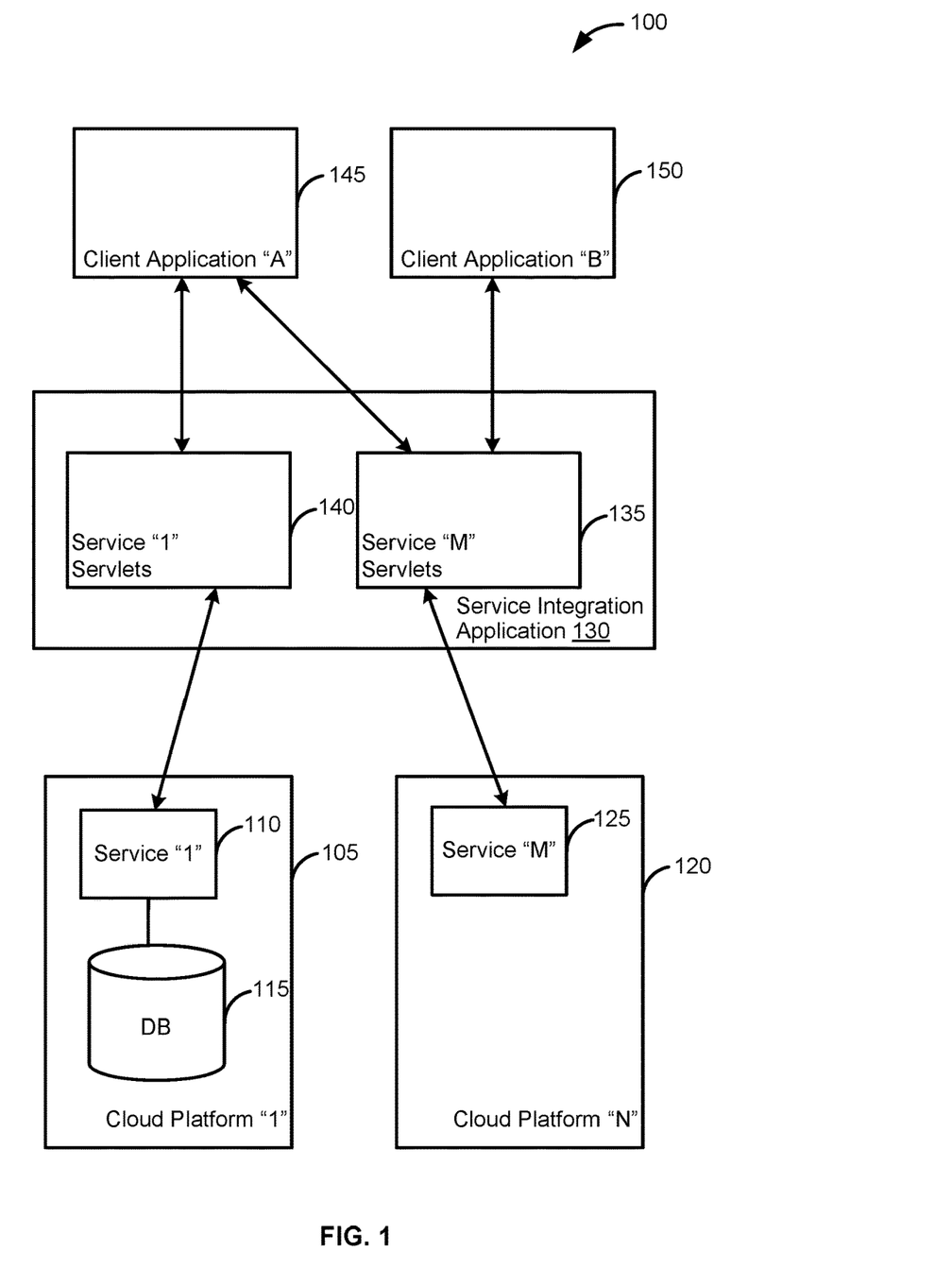
FIG. 1 is a block diagram illustrating a system for integrating cloud services for consumption in applications, according to one embodiment.

FIG. 1 is a block diagram illustrating exemplary system 100 for integrating cloud services into applications, according to one embodiment. Service "1" 110 is provided as a cloud service from Cloud Platform "1" 105. Service "1" 110 is associated with a Database (DB) 115, where data associated with operation of Service "1" 110 is stored. Service "M" 125 is provided as a cloud service from Cloud Platform "N" 120. The Cloud Platform "1" 105 and Cloud platform "N" 120 may be development platform providing tools and resources for designing, developing, provisioning, maintaining, etc. of cloud application. The cloud platform "1" 105 and Cloud Platform "N" 120 may provide Service "1" 110 and Service "M" 125 for consumption by cloud based applications build on top of cloud platforms, such as Cloud Platform "1" 105 and Cloud Platform "N" 120.

Examples of a cloud platform service, such as Service "1" 110 or Service "M" 125, may be a document service for managing documents and data, a connectivity service for reliable and easy-to-consume access to business systems either running on premise or on-demand, an identity service for handling the identity management and authentication at applications that are deployed and started on the cloud platform, an Internet of Things (IoT) service to provide the ability to quickly develop, deploy, and manage real-time IoT and machine-to-machine (M2M) and remote data synch applications, a gamification service to quickly incorporate gamification concepts into new and existing applications, etc. A cloud application may integrate more than one of the cloud provided services to adjust consumed data for a specific user scenario. Integration and bundling of multiple services is usually done at server side. This may require that compatibility is already ensured during design time of the application and the corresponding development efforts are done on service implementation level. The configuration of cloud service bundling may require interfaces and/or tools. Including an additional cloud service into a cloud application, which is currently developed, may require that the additional cloud service complies with the corresponding interfaces provided by the other cloud services integrated into the application. For example, if one service would rely on features of another service, according Application Programming Interface (API) may be provided by the other service, and the integration may be done on server side. The service bundling may be limited to the level of integration and may not allow flexibility for the end user.

In one embodiment, Service Integration Application 130 integrates services provided by a set of platforms, e.g., from Cloud Platform "1" 105 to Cloud Platform "N" 120. The Service Integration Application 130 may be an intermediate application tier, which includes additional functionality to the functionality provided by the services offered by the platforms. The Service Integration Application 130 may be associated with different types of platforms. The Service Integration Application 130 may be associated with a specifically defined list of services offered by the related platforms. The Service Integration Application 130 may provide interfaces correspondingly defined for the list of services to be associated with. For example, the Service Integration Application 130 may be implemented as a Java application, which provides servlets extending the associated services. A Service "1" Servlets 140 may be instantiated at the Service Integration Application 130 in relation to Service "1" 110.

In one embodiment, Client Application "A" 145 may be developed to include functionality and resources provided by the Service "1" 110 and the Service "M" 125. To integrate the resources provided by the Service "1" 110 and the Service "M" 125, corresponding servlets—Service "1" Servlets 140 and Service "M" Servlets 135 are implemented at the Service Integration Application 130. The Client Application "A" may be implemented to utilize resources provided by a given service and utilize these resources for performing additional operations to provide enhanced functionality to application's end user. In one embodiment, the Client Application "A" 145 may request data and/or other resources from service "1" 110 through communication with the Service "1" Servlets 140. The requested data may be received at Service "1" Servlets 140 and communicated to the Client Application "A" 145. Such consumed requested data may be further monitored and used in the context of the implemented logic of Service "M" 125. The Client Application "A" 145 may be implemented in such a way as to monitor received resources, data, and/or events related to Service "1" 110. The monitoring may be performed based on the communication of the Client Application "A" 145 with the Service "1" Servlets 140. According to the application's implemented logic, the received data and/or events may be provided to be consumed by Service "M" Servlets 135, which are associated with Service "M" 125."

In one embodiment, a Client Application "B" 150 may be developed to consume resources and functionality from one cloud service—Service "M" 125. The integration of the cloud service—Service "M" 125 may require additional implementation logic to be included, which is not part of the Service "M" 125. The Client Application "B" 150 may connect to the Service Integration Application 130 to integrate the resources and functionality provided by the Service "M" 125 into the implemented functionality of the Application "B" 150. The Service "M" Servlets 135 are associated with the Service "M" 125 and may provide different APIs that may be exposed for consumption while designing and developing the client Application "B". The Client Application "B" 150 may be implemented to consume and/or provide data to the Service "M" Servlets 135 to operate, serve clients' requests, and provide functionality as implemented.

Figure 2:
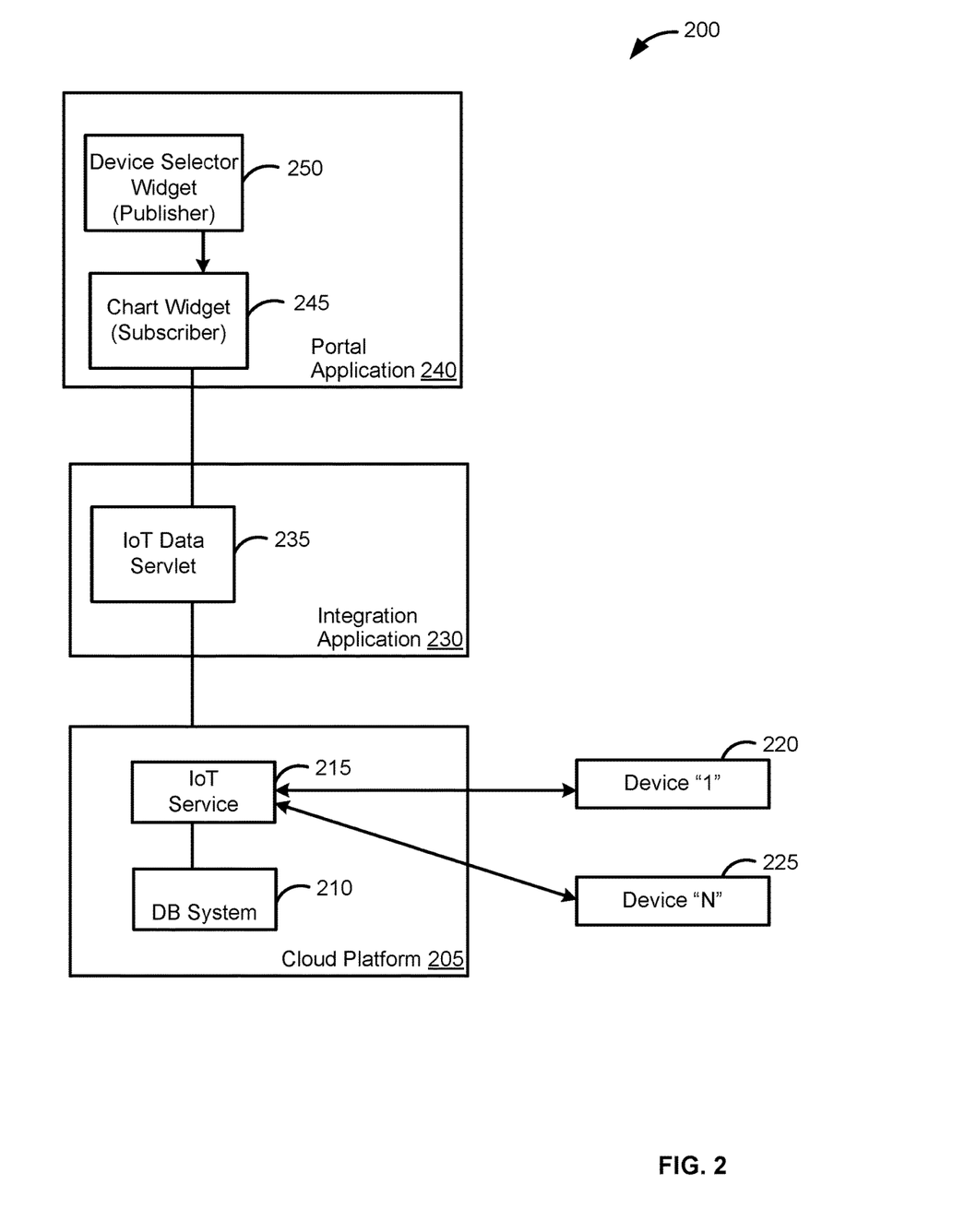
FIG. 2 is a block diagram illustrating an exemplary system for integrating an exemplary cloud service into a portal application running on a cloud platform, according to one embodiment.

FIG. 2 is a block diagram illustrating exemplary system 200 for integrating an exemplary cloud service into a portal application running on Cloud Platform 205, according to one embodiment. The Cloud Platform 205 may be, for example, SAP HANA Cloud Platform offered by SAP SE. The Cloud Platform 205 may offer services such as the Internet of Things (IoT) Service 215 that allows managing and acquiring data from IoT devices. The IoT service 215 is associated with one or more devices—from Device "1" 220 to Device "N" 225. Such devices may include, for example, sensors to measure temperature at refrigerator, sensors in a car to monitor car speed, etc. Data collected by the IoT service 215 may be stored in a database (DB) System 210 at the Cloud Platform 205. The IoT service 215 may be a tenant of platform service provided at the Cloud Platform 205, designed to a particular customer.

Integration Application 230 may be provided to handle interaction between applications, such as Portal Application 240, and the platform services, such as the IoT Service 215. The Integration Application 230 provides a set of instantiated interfaces, e.g., correspondingly defined for related platform services. The Integration Application 230 provides integration functionality between the platform services that are defined. The IoT service 215 is connected to the Integration Application 230. The Integration Application 230 may include an application providing an IoT Data Servlet 235 that consumes data stored at the DB System 210 in relation to collected data by the IoT Service 215 for the connected devices.

In one embodiment, Portal Application 240 may be created as a web application. The portal application may be designed as a mashup application that uses content from one or more sources to provide a new service at a user interface. The user interface (UI) of the Portal Application 240 may be a Graphical User Interface (GUI) that includes a set of UI elements that are associated with the IoT Service 215. The UI elements of the GUI may include, for example, device selector widget 250 and Chart Widget 245. The GUI of the Portal Application 240 may further include other UI elements, such as widgets, gadgets, text boxes, text fields, menus, etc. The UI of the Portal Application 240 may be designed to provide information and data associated with a set of devices, which are of interest to a user of the portal application. For example, a user may authenticate with the Portal Application 240 and for that user, the Portal Application 240 may be configured to be associated with some (or all) of the devices connected with the IoT Service 215. For example, the Portal Application 240 may be created for monitoring stored data received from Device "1" 220 and Device "N" 225.

The Device Selector Widget 250 may be connected with the IoT Data Servlet 235 from the Integration Application 230 and may be associated with publishing received data on the UI of the Portal Application 240. For example, at the device Selector Widget 250 one or more devices from the devices associated with the IoT Service 215 may be selected to consume IoT data from the DB System 210. The Device Selector Widget 250 may be associated with a second widget at the UI of the Portal Application 240. The second widget may be Chart Widget 245, which receives notifications when devices are selected through the Device Selector Widget 250. The Chart Widget 245 may be subscribed to receive notifications from the device Selector Widget 250. Based on received notification, the Chart Widget 245 may add to the UI a chart associated with the data received from the devices selected through the device Selector Widget 250. The chart may be created based on predefined logic implemented in the portal application 240. The Chart Widget 245 may also present data received from other sources. The Device Selector Widget 250 may also push data received from the IoT service 215 to other elements and/or modules of the portal application.

Figure 3:
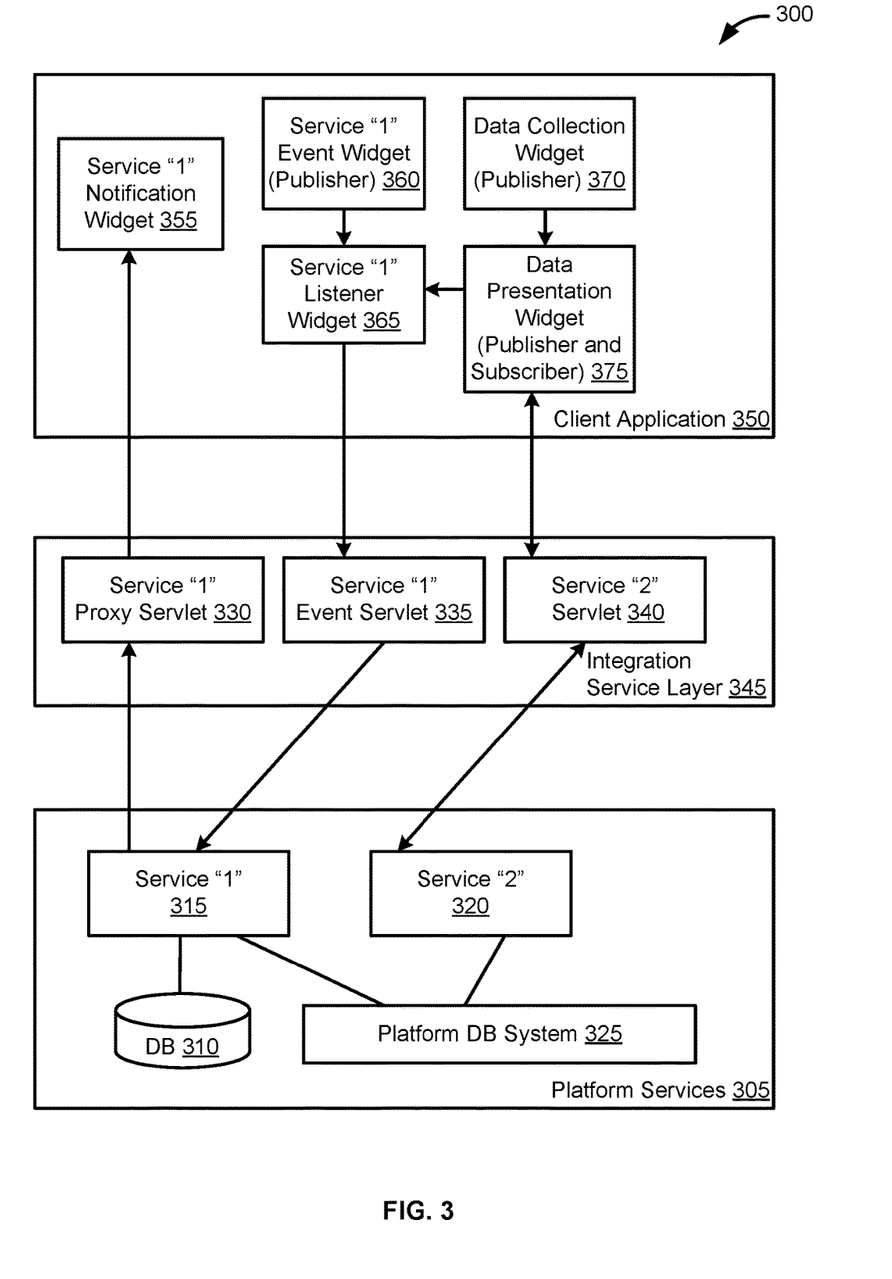
FIG. 3 is a block diagram illustrating an exemplary system for integrating services provided by a cloud platform into a client application running on the cloud platform through an integration service layer (ISL), according to one embodiment.

FIG. 3 is a block diagram illustrating exemplary system 300 for integrating services provided by a cloud platform into Client Application 350 running on the cloud platform, through Integration Service Layer (ISL) 345, according to one embodiment. Platform Services 305 are provided for consumption by applications. The Platform Services 305 may be provided from different platforms, which may include cloud platforms. The platform services 305 may include cloud services such as document services, IoT services, mobile device management services, gamification services, etc. The Platform Services 305 may include loosely coupled services. One or more services from the Platform Services 305 may be integrated in one application. Configuration of service bundling may require specific interfaces and/or tools. Furthermore, a service may have to comply to specific interfaces to be integrated with other service. For example, if one service would rely on features of another service, according API may be present to enable integration between the services. The Platform Services 305 include Service "1" 315 and Service "2" 320. The Service "1" 315 may be coupled to DB 310. The Service "1" 315 may be IoT service, such as the IoT Service 215, FIG. 2.

The Service "1" 315 may be provided by a first cloud platform. Service "2" 320 may or may not be provided by the same first cloud platform. The Service "1" 315 and Service "2" 320 may be connected to Platform DB System 325. The Platform DB System 325 may be a centralized DB system for the first cloud platform providing services for consumption by customers' applications. The platform DB System 325 may store data associated with resources and functionality provided by the first cloud platform. The Platform Services 305 may include services from other platforms, different from the first cloud platform. In addition, the Service "1" 315 and the Service "2" 320 may not be associated to a common platform DB system.

The Integration Service Layer (ISL) 345 may be utilized when developing Client Application 350 that integrates one or more services from the platform services 305. The service interaction at the Client Application 350, both consumption and data acquisition, associated with the included services, may be performed through servlets implemented and provided at the integration Service Layer 345. The Client Application 350 may be developed to consume and provide data from the one or more platform services from the Platform Services 305. The Integration Service Layer 345 includes Service "1" Proxy Servlet 330 and Service "1" Event Servlet 335 that are both associated with the Service "1" 315. In one embodiment, the Service "1" Proxy Servlet 330 may be implemented to provide data received from Service "1" 315 to Service "1" Notification Widget 355. The Service "1" Event Servlet 335 may be implemented to provide notifications to Service "1" 315 for a particular event, according to the client application's logic. The service "1" Event Servlet 335 may be associated with a widget from the client application, designed and configured to provide notifications when particular events are registered at the Client Application 350. Service "1" Event Widget 360 may be defined at the Client Application 350 to provide data to the user interface of the client application, related to service "1" 315. The Service "1" Event Widget 360 may publish data to Service "1" Listener Widget 365 when a particular event occurs. The Service "1" Listener Widget 365 may be configured in a listening mode for events, for example, received from the Service "1" Event Widget 360. The Client Application 350 may be integrated with a client based event bus implemented based on a technology offering API for application's communication. The widgets from the Client Application 350 may communicate via publish and subscribe patterns between each other.

In one embodiment, the Client Application 350 may be implemented to incorporate more than one service from the Platform Services 305. The integrated services may be offered by platform and/or service providers together with accordingly associated widgets. When designing the Client Application 350, the according widgets may be selected from services that may be offered in a container defied for the Client Application 350. Such a container may include widgets available for the services offered at the Platform Services 305. For example, the Service "1" Notification Widget may be offered in a container in association to the offered Service "1" 315. Such widgets may be utilized during interaction between services incorporated in the Client Application 350. Interfaces may be provided in relation to the offered widgets that may allow for events to be published and subscribed to at the client based event bus. Client Application 350 may be customized regarding what events may be published and subscribed for, e.g., based on defining configuration for the widgets.

In one embodiment, the Client Application 350 may also include implementation logic to incorporate functionality and resources provided by the Service "2" 320. The Client Application 350 may communicate with the Service "2" 320 through the ISL 345. The ISL 345 may provide Service "2" Servlet 340 that assists communication between Service "2" 320 and the Client Application 350. The Service "2" Servlet 340 may extend the functionality provided by the service "2" as instantiated at the platform on which it is deployed.

The Service "2" Servlet 340 may support interaction of data between the Client Application 350 and services consumed by the client application, apart from the Service "2" 320. The Service "2" Servlet 340 may receive data and push data between the Client Application 350 and the Service "2" 320. The Service "2" Servlet 340 may be associated with Data Presentation Widget 375, which may be subscribed to receive data from Service "2" 320 through the Service "2" Servlet 340. The Data Presentation Widget 375 may also publish data to the Service "1" Listener Widget 365, when predefined events are registered, which may trigger corresponding notifications.

The Client Application 350 may be created to include UI objects and elements (e.g. widgets), to perform defined application's logic. The widgets that may be used in the Client Application 350 may be particularly associated with consumed services provided by platforms, such as services from the Platform Services 305. When a widget is designed to serve a particular purpose in relation to a consumption of a particular platform service, the widget may be connected to a provided servlet from the ISL 345 to facilitate the integration of the particular platform service into the client's application logic. The Client Application 350 may include widgets that may be associated with two services from the Platform Services 305. In such manner, the Data Presentation Widget 375 which is associated with the Service "2" 320, may publish values on the UI. The Data Presentation Widget 375 may be a chart widget that presents the values in a graphical representation format. The Service "1" Listener Widget 365 may be subscribed to according events from the Data Presentation Widget 375, and may send the values to the Service "1" 315. For example, the Service "1" 315 may be associated with defined rules, which may be used to evaluate the values received by the Service "1" Listener Widget 365 and evaluation result may be published via a third widget, e.g., the Service "1" Notification Widget 355. Users of the Client Application 350 are able to build their own configuration of multiple services from the Platform Services 305 to incorporate their implemented logic into the functionality provided by the Client Application 350 through the ISL 345.

For example, the Service "1" 315 may be a gamification service, and Service "2" 320 may be an IoT service, such as the IoT Service 215, FIG. 2. The gamification service may be utilized to introduce a gamification concept in the client application. Gamification is a methodology to improve user engagement and may be in a variety of domains and types of software applications. The gamification concept may be configured in the logic of an application, and particular rules and criteria may be defined at application level. The gamification concept may be presented to users through different UI elements and notifications. The gamification concept may be integrated within an UI of the application. When the application includes the gamification concept, the UI of the application may be designed in such manner that a gamification service provided by a cloud platform is integrated in the application logic. A cloud provider may offer the gamification service and the gamification service may be associated with a particular UI technology or UI framework, such as SAPUI5 provided by SAP SE. A UI framework may provide gamification controls, such as a leaderboard, badges, and/or event hooks to trigger events in the gamification service. In such manner, the UI of the application may be designed based on the UI framework, which is related to the gamification service. The design and development of the application may be based on using the according UI technology and leverage on the gamification controls which are seamlessly interconnected with the gamification service to be consumed. No additional integration steps may be necessary for the application to integrate the gamification concept through consumption of the gamification service connected with the UI framework. When such a UI framework is used, the gamification concept is embedded in the UI of the application, and particular gamification rules and properties may be configured. Modification of gamification properties may be defined as suggested by the UI elements provided by the UI framework. Based on such modification, events may be sent to the gamification service, and notifications and data may be consumed from the gamification service.

An application, such as the Client Application 350, may include not only a gamification service, but also other platform services. For example, the Client Application 350 may include as Service "1" 315—a gamification service, and as Service "2" 320—an IoT service (as the one discussed in relation to FIG. 2). The IoT service may be utilized and incorporated into the application to receive notifications for data collected from different devices. The data collected from the devices may be one of the points involved in a gamification concept. Therefore, an integration between the gamification service and the IoT service may be defined for the Client Application 350. The integration of the services may be performed based on the provided servlets at the ISL 345 that may be particularly designed to interconnect with UI elements from the UI of the Client Application 350. A user may interact with the UI of the Client Application 350 to monitor device data consumed from the IoT service, and at the same time to monitor performance of other events associated with a particular game target as defined in the gamification concept implemented in the Client Application 350.

Figure 4:
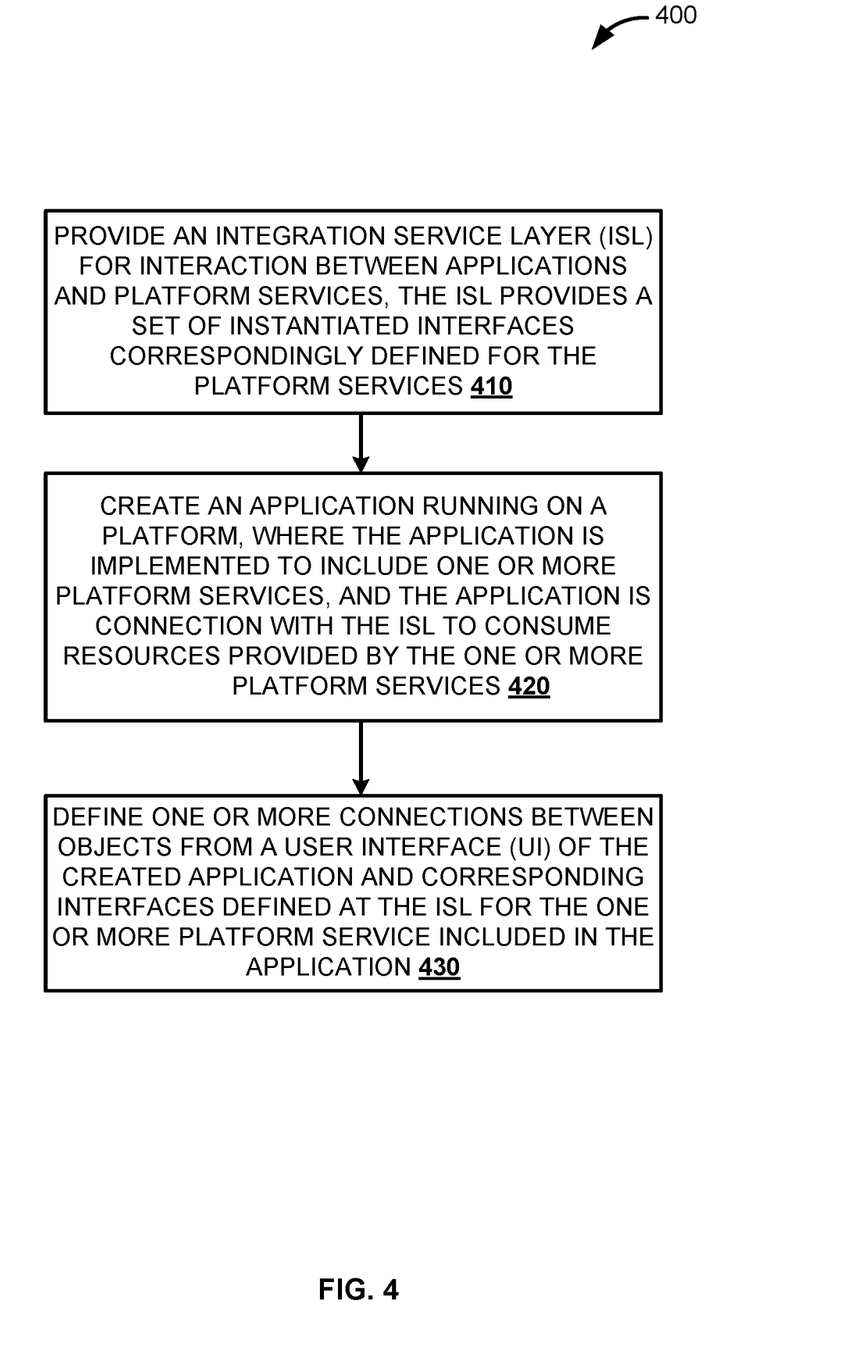
FIG. 4 is a flow diagram illustrating a process for integrating cloud services into applications, according to one embodiment.

FIG. 4 is a flow diagram illustrating a process 400 for integrating cloud services into applications, according to one embodiment. The cloud services may be such as the described services provided by cloud platforms above. The cloud services may run as SaaS instances on one or more clouds platforms and be consumed by other cloud application that extend their functionality through utilizing service provided functionalities. In some embodiments, the consumption of service provided functionality and resources may require integration and binding of operations of the services. Therefore, a middle tier for integration between services may be utilized.

At 410, an ISL for interaction between applications and platform services is provided. The platform services may be cloud services deployed on one or more cloud platforms. The ISL provides a set of instantiated interfaces correspondingly defined for the cloud service. The ISL may provide one or more interfaces for a cloud service. At 420, an application is created to run on a cloud platform. The application is implemented to consume one or more platform services from the provided platform services. The application is connected with the ISL to consume resources provided by one or more platform services from the platform services that are associated with the ISL. At 430, one or more connections between objects from a user interface of the created application and corresponding interfaces defined at the ISL for the one or more platform services included in the application are defined.

Figure 5:
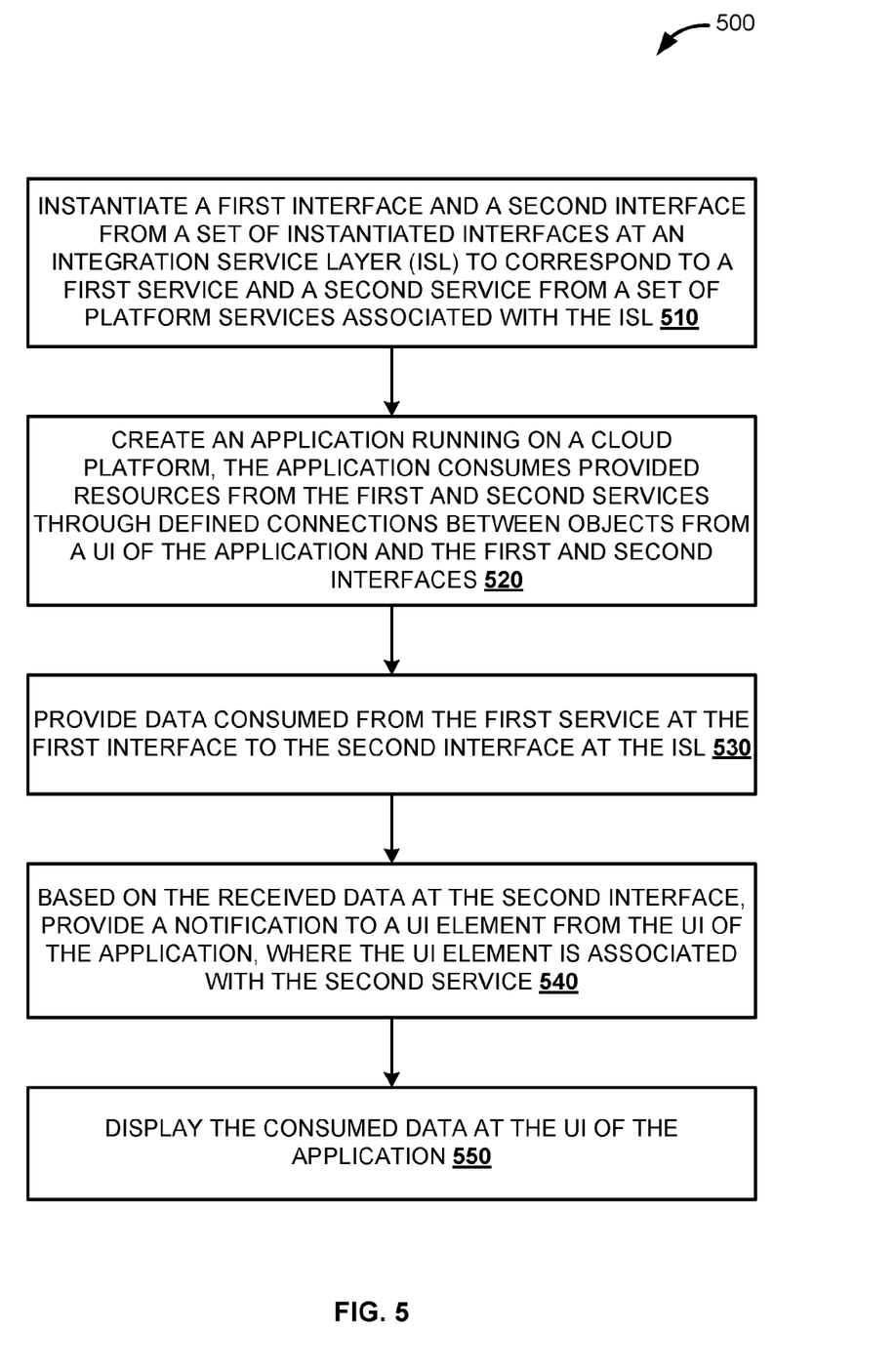
FIG. 5 is a flow diagram illustrating a process for integrating cloud services into applications through an ISL providing instantiated interfaces corresponding to the cloud services, according to one embodiment.

FIG. 5 is a flow diagram illustrating a process 500 for integrating cloud services into applications through an ISL providing instantiated interfaces corresponding to the cloud services, according to one embodiment. At 510, a first interface and a second interface from set of instantiated interfaces are instantiated at an ISL. The ISL may be the same as the ISL discussed in relation to the previously presented figures. The first and the second interface correspond to a first service and a second service from a set of platform services associated with the ISL. The first and the second interfaces are designed and implemented to interconnect functionality provided from the first service and the second service.

At 520, an application is created to run on a cloud platform. The application is created to include the first and the second services associated with the ISL. The cloud platform on which the application is deployed may be one of the platforms, which provides one of the first and second service included in the application. The application consumes provided resources from the first and second services through defined connections between objects from a UI of the application and the first and second interfaces. The objects from the UI of the application may be configured to communicate with the first and second interfaces and be notified once defined events are determined at the application's and/or service's side. The objects from the UI of the application may also communicate between each other to transfer relevant data and information. For example, the objects may be configured to publish data on the UI of the application, once data conforming to some conditions is received from the first service through the first interface.

At 530, data consumed from the first service at the first interface is provided to the second interface at the ISL. For example, the first service may be an IoT service that provides data associated with devices, which are monitored by the application. Monitored data may be received at the first interface and provided from there to the UI of the application. Such data, may be fed in the second interface. The second interface may operate to execute the second service based on the received data and the implemented logic in the second service. For example, the second service may be a gamification service, which is incorporated in the application to introduce a gamification concept. The gamification concept may be related to the monitored devices through the IoT service. For example, the application may include implemented logic to maintain scores based on defined quantifiable criteria defined for received data from the monitored devices through the IoT service.

At 540, based on the received data at the second interface, a notification is provided to a UI element from the UI of the application. The UI elements from the UI of the application may be a widget, or a menu, or a text field. The UI element is defined to be associated with the second service during the creation of the application. At 550, the consumed data is displayed at the UI of the application, for example, at the UI element.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
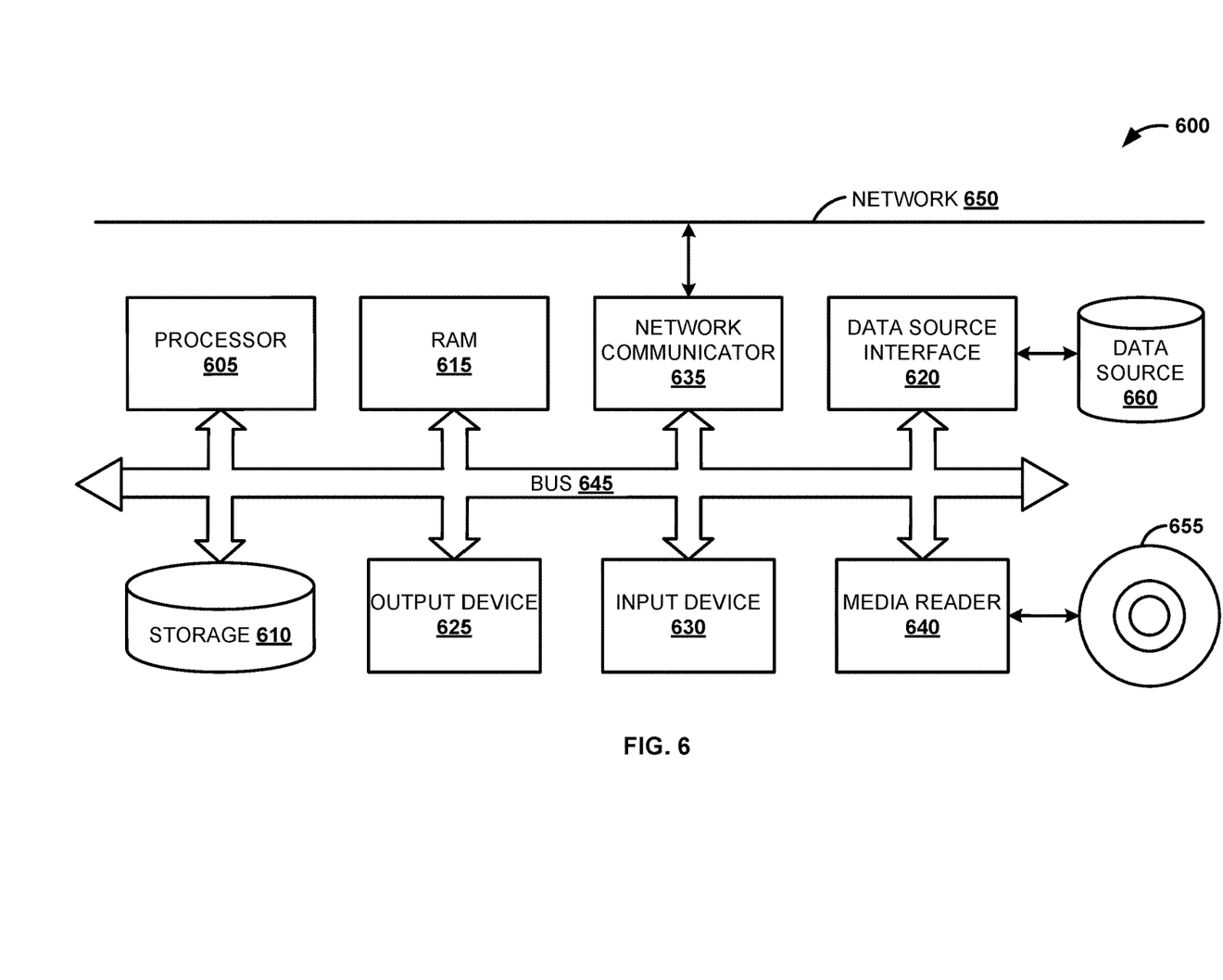
FIG. 6 is a block diagram illustrating an embodiment of a computing environment in which the techniques described for integrating cloud services into applications, can be implemented.

FIG. 6 is a block diagram of an exemplary computer system 600. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, all of the data required for processing may be stored in the RAM 615. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to integrate platform services into applications, the method comprising:

providing an integration service layer (ISL) for interaction between an application and a platform service;

the ISL providing at least one instantiated interface correspondingly defined for the platform service;

the ISL providing integration functionality between a plurality of platform services;

configuring the application to consume resources from the platform service through the ISL;

providing one or more servlets in the ISL;

the one or more servlets supporting data interaction at the application by implementing at least one of data acquisition and data consumption for the application at the ISL;

the application including implementation logic incorporating functionality and resources provided by the platform service into the application; and defining a connection between an object of a user interface (UI) of the application and the corresponding interface defined at the ISL for the platform service.

2. The method of claim 1, wherein the ISL extends capabilities and functionality provided by the plurality of platform services implemented correspondingly on one or more platforms to facilitate platform service integration.

3. The method of claim 2, wherein the platform service is a cloud service provided by a cloud platform and is associated with one or more interfaces from a set of instantiated interfaces provided at the ISL.

4. The method of claim 3, wherein an instantiated interface associated with the cloud service at the ISL includes additional implemented logic extending implemented logic of the cloud service as deployed and provided by the cloud platform, and wherein the additional implementation logic is associated with providing compatibility of the cloud service to be integrated into implementation of the application, wherein the application's implementation integrates one or more platform services into provided application's functionality.

5. The method of claim 4, wherein the additional implemented logic is related to facilitating integration of the cloud service with other platform services from the one or more platform services, wherein the other platform services are associated with corresponding instantiated interfaces at the ISL.

6. The method of claim 3, further comprising:

updating the UI of the application to include a widget associated with a consumed platform service from the plurality of platform services provided by the one or more platforms;

subscribing the widget to events determined at the ISL in relation to an instantiated interface provided for the consumed platform service; and triggering other events determined at the widget to be sent to other UI elements at the UI of the application.

7. The method of claim 6, further comprising:

instantiating a first interface and a second interface from the set of instantiated interfaces at the ISL to correspond to a first platform service and a second platform service from the plurality of platform services, wherein the first and the second interfaces are designed to interconnect functionality provided from the first platform service and the second platform service.

8. The method of claim 7, further comprising:

providing data consumed from the first platform service at the first interface to the second interface at the ISL;

based on the received data at the second interface, providing a notification to a UI element from the UI of the application, wherein the UI elements is associated the second platform service; and displaying the consumed data at the UI of the application.

9. The method of claim 8, wherein the second cloud service is a gamification service provided by a cloud platform, and wherein the application implements game-design elements associated with data consumed from the first cloud service.

10. A computer system to integrate cloud services into applications, the system comprising:
 a processor;
 a memory in association with the processor storing instructions, the instructions causing the processor to:
 provide an integration service layer (ISL) for interaction between an application and a platform service;
 the ISL is configured to provide at least one instantiated interface correspondingly defined for the platform service;
 the ISL is configured to provide integration functionality between a plurality of platform services;
 configure the application to consume resources from the platform service through the ISL;
 provide one or more servlets in the ISL;
 the one or more servlets configured to support data interaction at the application by implementing at least one of data acquisition and data consumption for the application at the ISL;
 the application including implementation logic incorporating functionality and resources provided by the platform service into the application; and
 define a connection between an object of a user interface (UI) of the application and the corresponding interface defined at the ISL for the platform service.

11. The system of claim 10, wherein the ISL extends capabilities and functionality provided by the plurality of platform services implemented correspondingly on one or more platforms to facilitate platform service integration, and wherein the platform service is a cloud service provided by a cloud platform and is associated with one or more interfaces from a set of instantiated interfaces provided at the ISL.

12. The system of claim 11, wherein an instantiated interface associated with the cloud service at the ISL includes additional implemented logic extending implemented logic of the cloud service as deployed and provided by the cloud platform, and wherein the additional implementation logic is associated with providing compatibility of the cloud service to be integrated into implementation of the application, wherein the application's implementation integrates one or more platform services into provided application's functionality.

13. The system of claim 11, wherein the memory further comprise instructions to:
 update the UI of the application to include a widget associated with a consumed platform service from the plurality of platform services provided by the one or more platforms; and
 subscribe the widget to events determined at the ISL in relation to an instantiated interface provided for the consumed platform service.

14. The system of claim 13, wherein the memory further comprises instructions to:
 instantiate a first interface and a second interface from the set of instantiated interfaces at the ISL to correspond to a first platform service and a second platform service from the plurality of platform services, wherein the first and the second interfaces are designed to interconnect functionality provided from the first platform service and the second platform service;
 provide data consumed from the first platform service at the first interface to the second interface at the ISL;
 based on the received data at the second interface, provide a notification to a UI element from the UI of the application, wherein the UI elements is associated the second platform service; and
 display the consumed data at the UI of the application.

15. A non-transitory computer-readable medium storing instructions, which when executed cause a computer system to:
 provide an integration service layer (ISL) for interaction between an application and a platform service;
 the ISL is configured to provide at least one instantiated interface correspondingly defined for the platform service;
 the ISL is configured to provide integration functionality between a plurality of platform services;
 configure the application to consume resources from the platform service through the ISL;
 provide one or more servlets in the ISL;
 the one or more servlets configured to support data interaction at the application by implementing at least one of data acquisition and data consumption for the application at the ISL;
 the application including implementation logic incorporating functionality and resources provided by the platform service into the application; and
 define a connection between an object of a user interface (UI) of the application and the corresponding interface defined at the ISL for the platform service.

16. The non-transitory computer-readable medium of claim 15, wherein the ISL extends capabilities and functionality provided by the plurality of platform services implemented correspondingly on one or more platforms to facilitate platform service integration, and wherein the platform service is a cloud service provided by a cloud platform and is associated with one or more interfaces from a set of instantiated interfaces provided at the ISL.

17. The non-transitory computer-readable medium of claim 16, wherein an instantiated interface associated with the cloud service at the ISL includes additional implemented logic extending implemented logic of the cloud service as deployed and provided by the cloud platform, and wherein the additional implementation logic is associated with providing compatibility of the cloud service to be integrated into implementation of the application, wherein the application's implementation integrates one or more platform services into provided application's functionality.

18. The non-transitory computer-readable medium of claim 16, further storing instructions to:
 update the UI of the application to include a widget associated with a consumed platform service from the plurality of platform services provided by the one or more platforms; and
 subscribe the widget to events determined at the ISL in relation.

19. The non-transitory computer-readable medium of claim 18, further storing instructions to:
 instantiate a first interface and a second interface from the set of instantiated interfaces at the ISL to correspond to a first platform service and a second platform service from the plurality of platform services, wherein the first and the second interfaces are designed to interconnect functionality provided from the first platform service and the second platform service.

20. The non-transitory computer-readable medium of claim 19, further storing instructions to:
- provide data consumed from the first platform service at the first interface to the second interface at the ISL;
- based on the received data at the second interface, provide a notification to a UI element from the UI of the application, wherein the UI elements is associated the second platform service; and
- display the consumed data at the UI of the application.

* * * * *